US012571960B2

(12) United States Patent (10) Patent No.: US 12,571,960 B2

Seyedi (45) Date of Patent: Mar. 10, 2026

(54) PHASE-DITHERING TECHNIQUES FOR ENCODING AUXILIARY INFORMATION WITHIN OPTICAL SIGNALS

(71) Applicant: Mellanox Technologies, Ltd., Yokneam (IL)

(72) Inventor: Mir Ashkan Seyedi, Atlanta, GA (US)

(73) Assignee: Mellanox Technologies, Ltd., Yokneam (IL)

( * ) Notice: Subject to any disclaimer, the term of this patent is extended or adjusted under 35 U.S.C. 154(b) by 294 days.

(21) Appl. No.: 18/120,071

(22) Filed: Mar. 10, 2023

(65) Prior Publication Data

US 2024/0302587 A1 Sep. 12, 2024

(51) Int. Cl.
*G02B 6/12* (2006.01)
*G02B 6/293* (2006.01)

(52) U.S. Cl.
CPC ..... *G02B 6/12007* (2013.01); *G02B 6/29338* (2013.01)

(58) Field of Classification Search
CPC .............. G02B 6/29338; G02B 6/2934; G02B 6/29341; G02B 6/29343; G02B 6/2935; G02B 6/29352; G02B 6/29353; G02B 6/29355
See application file for complete search history.

(56) References Cited

U.S. PATENT DOCUMENTS

| | | | |
|---|---|---|---|
| 2010/0074444 A1* | 3/2010 | Etemad ................. | H04B 10/85 |
| | | | 380/42 |
| 2019/0013878 A1* | 1/2019 | Paraiso ................ | H04L 9/0852 |
| 2019/0280780 A1* | 9/2019 | Graceffo ............. | H04B 10/697 |
| 2020/0200975 A1* | 6/2020 | Ma .......................... | G02F 1/225 |

* cited by examiner

*Primary Examiner* — Chad H Smith

(74) *Attorney, Agent, or Firm* — Lowenstein Sandler LLP

(57) ABSTRACT

A system can include one or more phase encoders. Each phase encoder of the one or more phase encoders is configured to receive an optical signal from an optical signal generator that generated the optical signal, and generate, using a ring resonator having a resonant frequency, a phase-encoded signal by encoding auxiliary information into a phase of the optical signal.

14 Claims, 9 Drawing Sheets

700

START

Receive an optical signal from an optical signal generator
that generated the optical signal
710

Generate, from the optical signal, a phase-encoded signal
by encoding auxiliary information into a phase of the optical
signal
720

Send the phase-encoded signal to a transmitter
730

END

PHASE-DITHERING TECHNIQUES FOR ENCODING AUXILIARY INFORMATION WITHIN OPTICAL SIGNALS

TECHNICAL FIELD

At least one embodiment pertains to processing resources used to perform and facilitate high-speed communications. For example, at least one embodiment pertains to technology for implementing phase-dithering techniques for encoding auxiliary information within optical signals.

BACKGROUND

Communication systems transmit signals from a transmitter to a receiver via a communication channel or medium (e.g., cables, printed circuit boards, links, wirelessly, etc.) For example, the transmitter can use serial communication to transmit serial data within a serial data stream to the receiver via a serial communication channel (e.g., data sent sequentially on a per-bit basis over a single channel). As another example, the transmitter can use parallel communication to transmit parallel data within a parallel data stream to the receiver via the communication channel (i.e., multiple bits of data sent simultaneously via respective channels). Data can be encoded within a carrier wave or signal using a modulation technique. One example of a modulation technique is frequency modulation, which encodes data within a carrier signal by varying the frequency of the carrier signal. To do so, a modulator can combine the carrier signal with a data signal (i.e., baseband signal) to generate a modulated signal.

BRIEF DESCRIPTION OF DRAWINGS

Various embodiments in accordance with the present disclosure will be described with reference to the drawings, in which.

DETAILED DESCRIPTION

Figure 1:
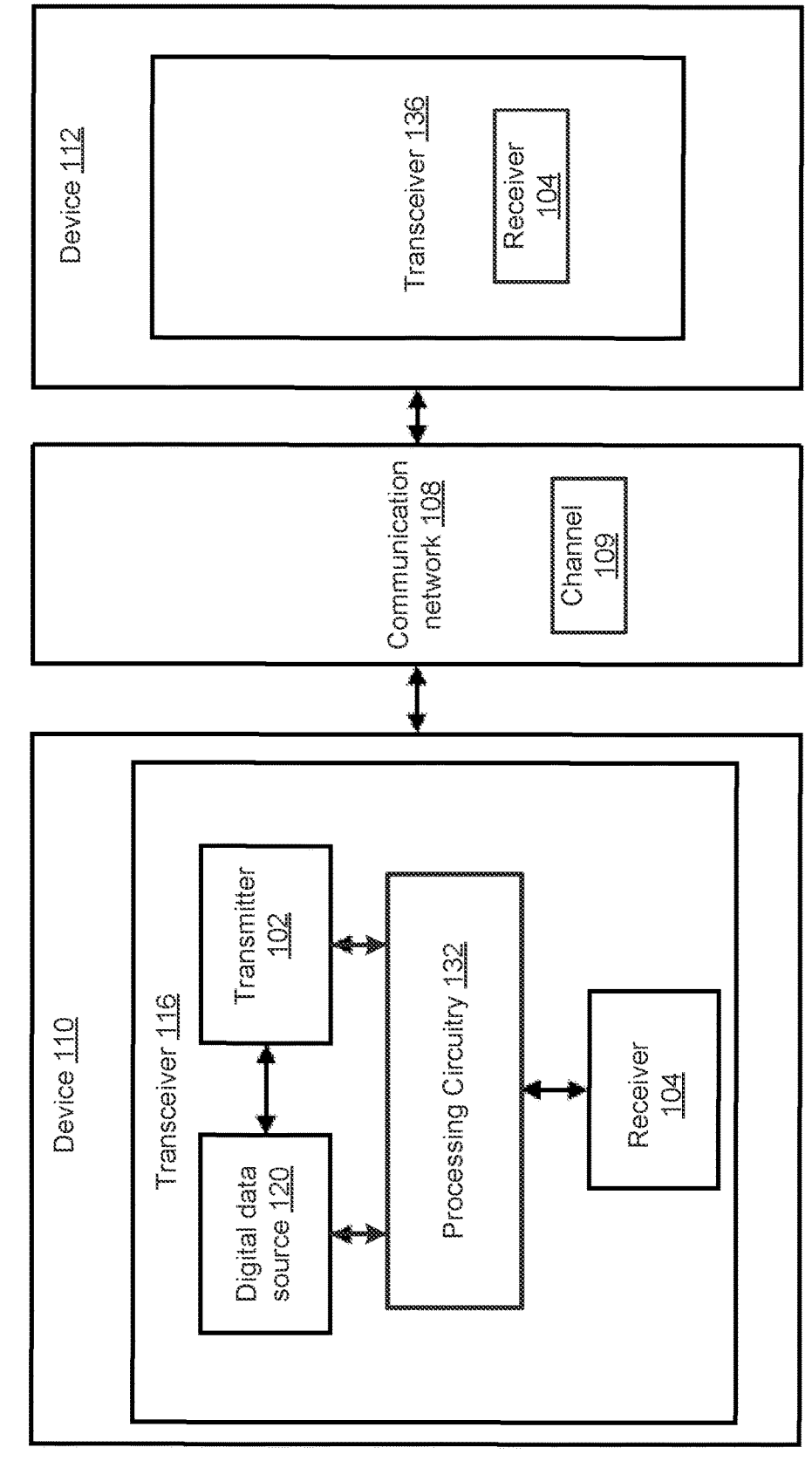
FIG. 1 is an example communication system, in accordance with at least some embodiments.

An optical receiver can receive optical signals generated by an optical signal generator. For example, the optical signal generator can include a laser. The optical signals received by the optical receiver can include polarized light each corresponding to a respective polarization, or electromagnetic mode. The optical receiver can receive polarized light via one or more waveguides. For example, an optical receiver can receive polarized light having a first electromagnetic mode via a first waveguide and a second electromagnetic mode different from the first electromagnetic mode via a second waveguide. Each of the electromagnetic modes can reflect polarized light having a respective polarization state. One example of a polarization state is a linear polarization state (e.g., confinement of the electric field of light to a single plane along the direction of propagation). If the optical receiver receives polarized light having a first electromagnetic mode ($EM_1$) and polarized light having a second electromagnetic mode ($EM_2$), then the optical receiver can receive a mixture of polarized light as $\alpha EM_1 \times \beta EM_2$, where $\alpha, \beta \in [0,1]$ and $\alpha + \beta = 1$. Accordingly, the optical receiver can receive either entirely polarized light having the first electromagnetic mode, entirely polarized light having the second electromagnetic mode, or any suitable mixture of polarized light having the first and second electromagnetic modes.

In some implementations, the first electromagnetic mode can be a transverse-magnetic (TM) mode and the second electromagnetic mode can be a transverse-electric (TE) mode. For example, the TE mode can reflect polarized light having s-polarization (e.g., the electric field is parallel to the plane of incidence of light), and the TM mode can reflect polarized light having p-polarization (e.g., the electric field is perpendicular to the plane of incidence of light).

A relationship exists between the local or effective index of refraction of a waveguide medium (e.g., silicon) and the velocity or speed at which a pulse of light travels through the waveguide, referred to as group velocity. More specifically, group velocity refers to the speed at which a range of frequencies travel to create a time-domain pulse. For example, group velocity can be approximated as $c/n_i$, where c refers to the speed of light in a vacuum and $n_i$ refers to an effective index of refraction of the waveguide for guiding an optical signal having to an i-th electromagnetic mode (e.g., TM mode or TE mode).

Illustratively, light received by the optical receiver can be received by (e.g., impinged onto) a photodetector from two separate polarized light inputs. For example, polarized light having the TM mode and polarized light having the TE mode at the same frequency can be combined and injected into a photodetector. Alternatively, polarized light having the TM mode and polarized light having the TE mode may be injected into the photodetector without being combined. As mentioned above, polarized light having different electromagnetic modes can travel through respective waveguides having different indices of refraction. Therefore, polarized light having different electromagnetic modes can arrive at the photodetector at different times, where the difference in time is a function of at least the length of the waveguide and the difference in group velocity between the different electromagnetic modes. Local temperature variations, which result in variations in the indices of refraction and thus group velocity as described above, can also impact the arrival times of polarized light to their respective destinations. These impacted arrival times can result in errors in the received optical signals. For example, these effects can be observed with respect to an optical component (e.g., optical chip) into a device (e.g., switch, GPU and/or CPU), as the optical component can experience local temperature variations as the device heats up or cools down in accordance with its workload. Moreover, polarized light having one electromagnetic mode may see a different temperature and perhaps a path length difference due to fabrication variation as compared to polarized light having another electromagnetic mode, which should generally be compensated for to reduce or eliminate jitter and errors.

Optical interconnects can be used in a variety of applications, such as switches, processing units (e.g., graphics processing units (GPUs), etc. An optical interconnect can include an optical link (e.g., optical fiber) to transmit an optical signal. Optical interconnect bandwidth can be scaled by transmitting an optical signal including multiple wavelengths using the same optical link. In doing so, the transmitter is tuned to receive the optical signal. Moreover, each modulator of a modular array can be tuned to receive a respective carrier frequency. Ordering the multiple wavelengths can be important to ensure that the transmitter and receiver are properly communicating data contained with the optical signal. Various techniques can be used to encode auxiliary information into an optical signal to indicate the proper order of wavelengths. For example, one technique can include encoding auxiliary information in header data (e.g., a set of bits) at the beginning of a data stream being carried by the optical signal, where the header data can include information indicating a source of the data and/or optical signal. The header data can be a predefined data pattern determined in accordance with a communication protocol. As another example, another technique can include encoding the auxiliary information into the amplitude of the optical signal using amplitude modulation. Some techniques can rely on out-of-band communication to transmit auxiliary information between system components (e.g., optical signal generators and transmitters). Such techniques can introduce overhead into the data stream and/or optical signal, which can undesirably increase system complexity and lower overall optical link efficiency.

Aspects of the present disclosure can address the deficiencies above and other challenges by implementing phase-dithering techniques for encoding auxiliary information within optical signals. Embodiments described herein can use one or more phase encoders to generate one or more respective phase-encoded signals received from one or more optical signal generators. In some embodiments, an optical signal generator is a multi-wavelength optical signal generator.

More specifically, each phase encoder can encode auxiliary information in the phase of the respective optical signal. The auxiliary information can include information indicative of a state of the optical signal or the optical signal generator. In some embodiments, auxiliary information can include at least one identifier for the optical signal. For example, the at least one identifier of the optical signal can include at least one of: an identifier of a wavelength of the optical signal, an identifier of a frequency of the optical signal, or an identifier of the optical signal generator that generated the optical signal. In some embodiments, auxiliary information can include temperature information related to the optical signal generator that generated the optical signal. In some embodiments, auxiliary information can include power information related to the optical signal generator that generated the optical signal.

In some embodiments, the one or more optical signal generators include a plurality of optical signal generators (e.g., a bank of optical signal generators) and the one or more phase encoders include a plurality of phase encoders. Each phase encoder of the plurality of phase encoders can receive an optical signal from a respective optical signal generator, and generate, from the optical signal, a respective phase-encoded signal of a plurality of phase-encoded signals. The plurality of phase-encoded signals can be received by an optical signal combiner to generate a combined phase-encoded signal. More specifically, the optical signal combiner can place each phase-encoded signal (which can be arbitrarily chosen) onto a single output, such that the auxiliary information of each phase-encoded signal remains unchanged. In some embodiments, the optical signal combiner includes an optical multiplexer.

A phase encoder described herein can be implemented with a device that does not add substantial, if any, overhead and/or that minimally impacts the amplitude of the optical signal. In some embodiments, a phase encoder is implemented by an optical ring resonator ("ring resonator"). A ring resonator can include set of waveguides in which at least one waveguide is in the form of a closed loop ("ring waveguide") disposed between a pair of bus waveguides (e.g., an input waveguide and an output waveguide). A ring resonator can have an associated resonant frequency. At the resonant frequency, a phase shift of $\pi$ can be observed. However, for non-resonant frequencies, the phase shift can asymptotically approach 0 or $2\pi$ radians (which are mathematically equivalent). For example, the relationship between frequency and phase shift can generally be modeled by a function $f(x)$, $$f(f_0) = \pi, \lim_{x \to 0} f(x) = 0 \text{ and } \lim_{x \to \infty} f(x) = 2\pi,$$

where x is frequency of the optical signal received by the ring resonator, $f_0$ is a resonant frequency of the ring resonator and $f(x)$ is the phase shift at the frequency x. For example, $f(x) \sim \arctan(x)$. Accordingly, a ring resonator can be configured to encode a full 360° of phase with minimal attenuation to the amplitude of an optical signal.

In some embodiments, the ring resonator used to implement the phase encoder is an overcoupled ring resonator. An overcoupled ring resonator is a ring resonator in which the input energy is greater than the held energy plus the output energy. This contrasts with an undercoupled ring resonator in which the input energy entering the ring resonator cavity is less than held energy maintained within the ring resonator cavity plus output energy leaking out of the ring resonator cavity, and a critically coupled ring resonator in which the input energy is equal to the held energy plus the output energy. More specifically, a ring resonator can include an overcoupled ring resonator cavity operating in an overcoupled regime in which the amplitude of the optical signal is minimally impacted. This is in contrast to, e.g., a critically coupled ring resonator in which the ring resonator can more significantly impact (e.g., attenuate) the amplitude of the optical signal. Thus, by using an overcoupled ring resonator to encode auxiliary information by employing phase shift at the resonant frequency, a minimal amount of amplitude reduction of the optical signal can be achieved. In some embodiments, a reduction in amplitude of the optical signal of less than or equal to 5% is achieved using an overcoupled ring resonator. In some embodiments, at a reduction in amplitude of the optical signal of less than or equal to 1% is achieved using an overcoupled ring resonator. Thus, by slightly detuning the ring resonator with respect to the frequency of the optical signal, auxiliary information can be encoded into the phase of the optical signal with minimal impact to the amplitude of the optical signal.

In some embodiments, encoding auxiliary data into an optical signal includes tuning the resonant frequency of the ring resonator that received the optical signal. For example, the resonant frequency of the ring resonator can be modified using at least one electrical component. Examples of electrical components include diodes, resistors (e.g., resistive heating elements), transistors, etc. In some embodiments, a phase decoder is implemented using a ring resonator. Further details regarding the structure of a ring resonator will be described herein.

In some embodiments, a phase decoder receives a phase-encoded signal, and decodes the auxiliary information from the phase-encoded signal. In some embodiments, auxiliary information is decoded by employing a data mask that decodes the auxiliary information. The data mask can be designed in accordance with a communication protocol that defining the auxiliary information to be decoded from the phase-encoded signal. For example, auxiliary information can be encoded in accordance with a predefined bit pattern (e.g., auxiliary information template), and the data mask can be designed to recover the auxiliary information based on the predefined bit pattern.

In some embodiments, the phase decoder receives the phase-encoded signal from a phase encoder. In some embodiments, the phase decoder receives the phase-encoded signal as a combined phase-encoded signal from an optical signal combiner. In some embodiments, the phase decoder is included in a transmitter. For example, if the auxiliary information indicates that the temperature of the optical signal generator is high, then a transmitter can use the auxiliary information to change the temperature of the transmitter. As another example, if the auxiliary information indicates that an optical signal generator is close to failure (e.g., based on power degradation), then the transmitter can learn about the impending failure of the optical signal generator.

In some embodiments, a phase decoder is a self-heterodyne system. More specifically, a phase decoder can decode auxiliary information by causing interference between an optical signal and a phase-encoded signal generated from the optical signal, and identifying an output resulting from the interference. More specifically, the output indicates whether a phase shift exists between the optical signal and the phase-encoded signal. For example, if the phase shift between the optical signal and the phase-encoded signal is 0, then the output can be "1". As another example, if the phase shift between the optical signal and the phase-encoded signal is π radians, then output can be "1". In some embodiments, the phase decoder is implemented using a ring resonator having a resonant frequency. For example, an output signal can be read out from a drop port of the ring resonator implementing the phase decoder. In some embodiments, the phase decoder is implemented using an interferometer. For example, the interferometer can include a y-junction that can receive the optical signal and the phase-encoded signal. Further details regarding implementing phase-dithering techniques for encoding auxiliary information within optical signals will be described in further detail below with reference to FIGS. 1-9.

Advantages of the present disclosure include, for example, reduced complexity and improved signal integrity as compared to traditional techniques. For example, embodiments described herein can be used to ensure that auxiliary information is encoded into an optical signal without adversely impacting optical signal integrity (e.g., with minimal modulation of the amplitude) and/or without needing out-of-band communication.

FIG. 1 illustrates an example communication system 100 according to at least one example embodiment. The system 100 includes a device 110, a communication network 108 including a communication channel 109, and a device 112. In at least one embodiment, devices 110 and 112 are two end-point devices in a computing system, such as a central processing unit (CPU) or graphics processing unit (GPU). In at least one embodiment, devices 110 and 112 are two servers. In at least one example embodiment, devices 110 and 112 correspond to one or more of a Personal Computer (PC), a laptop, a tablet, a smartphone, a server, a collection of servers, or the like. In some embodiments, the devices 110 and 112 may correspond to any appropriate type of device that communicates with other devices connected to a common type of communication network 108. According to embodiments, the receiver 104 of devices 110 or 112 may correspond to a GPU, a switch (e.g., a high-speed network switch), a network adapter, a CPU, a memory device, an input/output (I/O) device, other peripheral devices or components on a system-on-chip (SoC), or other devices and components at which a signal is received or measured, etc. As another specific but non-limiting example, the devices 110 and 112 may correspond to servers offering information resources, services, and/or applications to user devices, client devices, or other hosts in the system 100. In one example, devices 110 and 112 may correspond to network devices such as switches, network adapters, or data processing units (DPUs).

Examples of the communication network 108 that may be used to connect the devices 110 and 112 include an Internet Protocol (IP) network, an Ethernet network, an InfiniBand (IB) network, a Fibre Channel network, the Internet, a cellular communication network, a wireless communication network, a ground referenced signaling (GRS) link, combinations thereof (e.g., Fibre Channel over Ethernet), variants thereof, and/or the like. In one specific but non-limiting example, the communication network 108 is a network that enables data transmission between the devices 110 and 112 using data signals (e.g., digital, optical, wireless signals).

The device 110 includes a transceiver 116 for sending and receiving signals, for example, data signals. The data signals may be digital or optical signals modulated with data or other suitable signals for carrying data.

The transceiver 116 may include a digital data source 120, a transmitter 102, a receiver 104, and processing circuitry 132 that controls the transceiver 116. The digital data source 120 may include suitable hardware and/or software for outputting data in a digital format (e.g., in binary code and/or thermometer code). The digital data output by the digital data source 120 may be retrieved from memory (not illustrated) or generated according to input (e.g., user input).

The transmitter 104 includes suitable software and/or hardware for receiving digital data from the digital data source 120 and outputting data signals according to the digital data for transmission over the communication network 108 to a receiver 104 of device 112. Additional details of the structure of the transmitter 124 are discussed in more detail below with reference to the figures.

The receiver 104 of devices 110 and 112 may include suitable hardware and/or software for receiving signals, such as data signals from the communication network 108. For example, the receiver 104 may include components for receiving optical signals.

The processing circuitry 132 may comprise software, hardware, or a combination thereof. For example, the processing circuitry 132 may include a memory including executable instructions and a processor (e.g., a microprocessor) that executes the instructions on the memory. The memory may correspond to any suitable type of memory device or collection of memory devices configured to store instructions. Non-limiting examples of suitable memory devices that may be used include Flash memory, Random Access Memory (RAM), Read Only Memory (ROM), variants thereof, combinations thereof, or the like. In some embodiments, the memory and processor may be integrated into a common device (e.g., a microprocessor may include integrated memory). Additionally or alternatively, the processing circuitry 132 may comprise hardware, such as an application-specific integrated circuit (ASIC). Other non-limiting examples of the processing circuitry 132 include an Integrated Circuit (IC) chip, a Central Processing Unit (CPU), a General Processing Unit (GPU), a microprocessor, a Field Programmable Gate Array (FPGA), a collection of logic gates or transistors, resistors, capacitors, inductors, diodes, or the like. Some or all of the processing circuitry 132 may be provided on a Printed Circuit Board (PCB) or collection of PCBs. It should be appreciated that any appropriate type of electrical component or collection of electrical components may be suitable for inclusion in the processing circuitry 132. The processing circuitry 132 may send and/or receive signals to and/or from other elements of the transceiver 116 to control the overall operation of the transceiver 116. In some embodiments, the processing circuitry 132 can facilitate a method to implement phase-dithering techniques for encoding auxiliary information within optical signal, as described below with reference to FIGS. 2-8.

The transceiver 116 or selected elements of the transceiver 116 may take the form of a pluggable card or controller for the device 110. For example, the transceiver 116 or selected elements of the transceiver 116 may be implemented on a network interface card (NIC).

The device 112 may include a transceiver 136 for sending and receiving signals, for example, data signals over a channel 109 of the communication network 108. The same or similar structure of the transceiver 116 may be applied to transceiver 136, and thus, the structure of transceiver 136 is not described separately.

Although not explicitly shown, it should be appreciated that devices 110 and 112 and the transceivers 116 and 120 may include other processing devices, storage devices, and/or communication interfaces generally associated with computing tasks, such as sending and receiving data.

Figure 2:
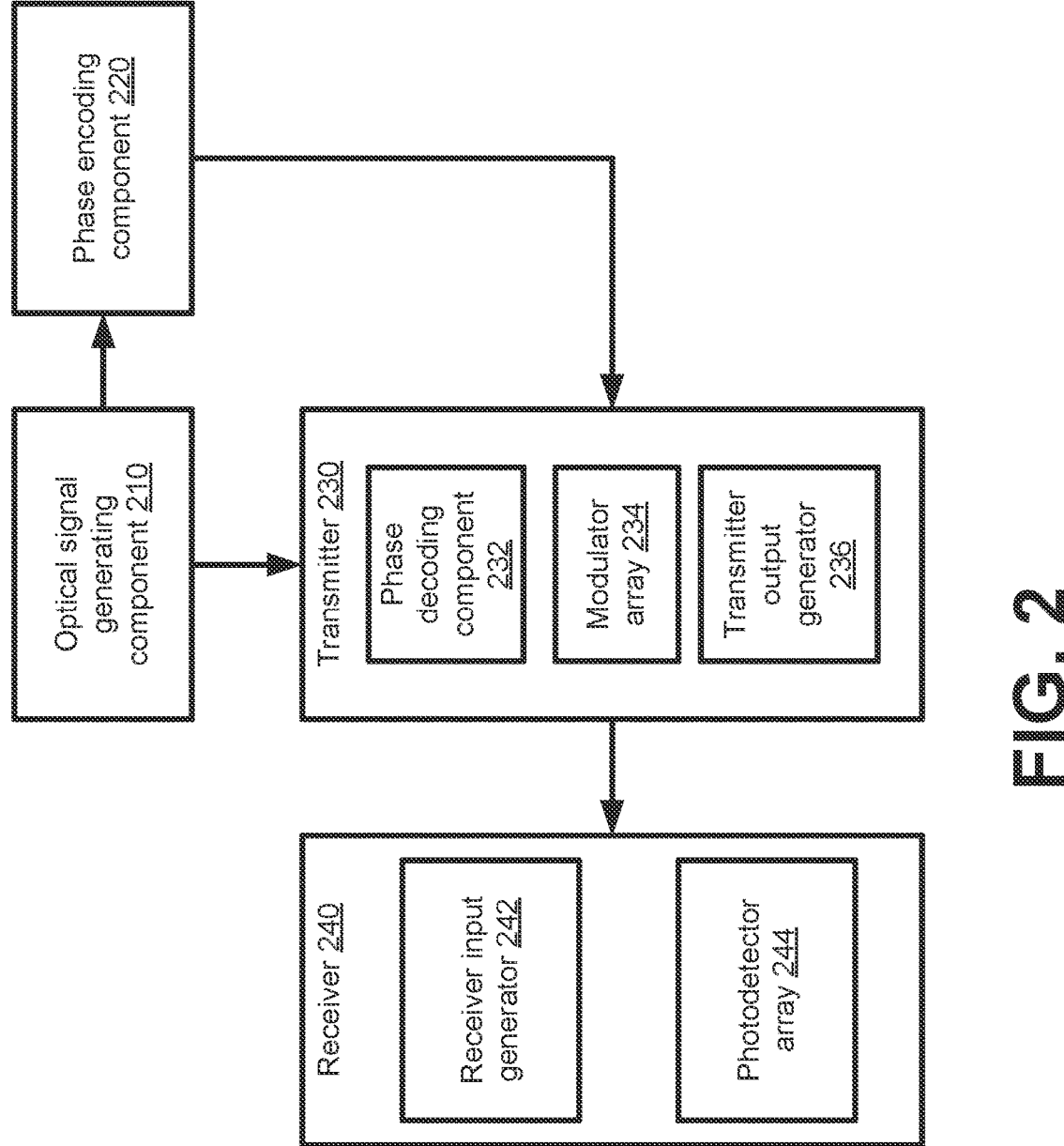
FIG. 2 illustrates an example system for implementing phase-dithering techniques for encoding auxiliary information within optical signals, in accordance with at least some embodiments.

FIG. 2 illustrates an example system 200 for implementing phase-dithering techniques for encoding auxiliary information within optical signals, in accordance with at least some embodiments. As shown, the system 200 can include optical signal generating component 210. Optical signal generating component 210 can include one or more optical signal generators. In some embodiments, an optical signal generator is a multi-wavelength signal generator configured to generate an optical signal having multiple wavelengths. In some embodiments, an optical signal generator is a laser.

The system 200 can further include phase encoding component 220. Phase encoding component 220 can include one or more phase encoders each configured to receive an optical signal from an optical signal generator, and generate a phase-encoded signal from the optical signal generated by optical signal generator. More specifically, a phase encoder can generate a phase-encoded signal by encoding auxiliary information into a phase of an optical signal. In some embodiments, phase encoding component 220 adds phase according to a data mask. The same data mask may then be used for decoding at later components.

In some embodiments, auxiliary information includes at least one identifier for the optical signal. For example, auxiliary information can include at least one of: an identifier of a wavelength of the optical signal, an identifier of a frequency of the optical signal, or an identifier of the optical signal generator that generated the optical signal. In some embodiments, auxiliary information can include temperature information related to the optical signal generator that generated the optical signal. In some embodiments, auxiliary information can include power information related to the optical signal generator that generated the optical signal.

In some embodiments, a phase encoder is implemented by a ring resonator. For example, the ring resonator can be an overcoupled ring resonator. The ring resonator can have a resonant frequency. Encoding auxiliary information into a phase of an optical signal can include causing a phase shift. For example, the phase shift can be a $\pi$ radian phase shift. In some embodiments, causing the phase shift can include modifying the resonant frequency. For example, a phase encoder can include at least one electrical component, operatively coupled to the ring resonator, to modify the resonant frequency. In some embodiments, the at least one electrical component is coupled to the ring resonator. Further details regarding the ring resonator will be described below with reference to FIG. 3.

The system 200 can further include transmitter 230. Transmitter 230 can be similar to transmitter 102 of FIG. 1. In some embodiments, and as shown in FIG. 2, transmitter 230 can include phase decoding component 232. In some embodiments, phase decoding component 232 can be separate from transmitter 230 (e.g., a standalone component). Phase decoding component 232 can include a phase decoder to decode the phase-encoded signal to obtain the auxiliary information. In some embodiments, auxiliary information is decoded by employing a data mask that decodes the auxiliary information. The data mask can be designed in accordance with a communication protocol that defines the auxiliary information to be decoded from the phase-encoded signal. For example, auxiliary information can be encoded in accordance with a predefined bit pattern at phase encoding component 220, and the data mask can be designed to recover the auxiliary information based on the predefined bit pattern.

In some embodiments, a phase decoder (e.g., phase decoding component 232) is a self-heterodyne system. More specifically, a phase decoder can decode auxiliary information by causing interference between an optical signal and a phase-encoded signal generated from the optical signal, and identifying an output resulting from the interference. More specifically, the output indicates whether a phase shift exists between the optical signal and the phase-encoded signal. For example, if the phase shift between the optical signal and the phase-encoded signal is 0, then the output can be "1". As another example, if the phase shift between the optical signal and the phase-encoded signal is $\pi$ radians, then output can be "1".

In some embodiments, phase decoding component 232 is implemented using a ring resonator having a resonant frequency (e.g., overcoupled ring resonator). For example, an output signal can be read out from a drop port of the ring resonator implementing phase decoding component 232. In some embodiments, phase decoding component 232 is implemented using an interferometer. For example, the interferometer can include a y-junction that can receive the optical signal and the phase-encoded signal.

In some embodiments, and as shown in FIG. 2, transmitter 230 includes modulator array 234. Modulator array 234 can include a set of optical modulators. An optical modulator is a device that can be used to modify a property of an optical signal (e.g., light). For example, modulator array 234 can include at least one of: an amplitude modulator, a phase modulator, a polarization modulator, etc. In some embodiments, modulator array 234 is separate from transmitter 230 (e.g., a standalone component). In some embodiments, optical signal generating component 210 can send the optical signal to phase encoding component 232 and modulator array 234. Further details regarding these embodiments will be described below with reference to FIG. 6.

Transmitter 230 can further include transmitter output generator 236 configured to generate a transmitter output. In some embodiments, transmitter output generator 236 includes a second phase encoder. The second phase encoder can generate a second phase-encoded signal by encoding second auxiliary information into a phase of the optical signal decoded by phase decoding component 232. In some embodiments, the second phase encoder is implemented by a ring resonator (e.g., overcoupled ring resonator).

System 200 can further include receiver 240. Receiver 240 can be similar to receiver 104 of FIG. 1. In some embodiments, and as shown in FIG. 2, receiver 240 can include receiver input generator 242 configured to generate a receiver input for the receiver. In some embodiments, receiver input generator 242 includes a second phase decoder. The second phase decoder can be configured to decode the second phase-encoded signal generate by transmitter output generator 236 to obtain the second auxiliary information. In some embodiments, the second phase decoder is implemented by a ring resonator (e.g., overcoupled ring resonator). In some embodiments, and as shown in FIG. 2, receiver input generator 242 is included within receiver 240. In some embodiments, receiver input generator 242 is separate from receiver 240.

The system 200 can further include photodetector array 244. Photodetector array 244 can include a set of photodetectors for sensing the optical signal. For example, each photodetector of photodetector array 244 can be configured to sense respective wavelength within an optical signal. In some embodiments, and as shown in FIG. 2, photodetector array 244 is included within receiver 240. In some embodiments, photodetector array 244 is separate from receiver 240.

In some embodiments, optical signal generating component 210 includes a plurality of optical signal generators, and phase encoding component 220 includes a plurality of phase encoders, where each phase encoder of the plurality of phase encoders is configured to receive an optical signal from a respective optical signal generator of the plurality of optical signal generators. For example, each phase encoder can include a respective ring resonator having a respective resonant frequency. In these embodiments, system 200 can further include an optical signal combiner. In some embodiments, the optical signal combiner is included in phase encoding component 220. In some embodiments, the optical signal combiner is included in transmitter 230. In some embodiments, the optical signal combiner is a standalone component. The optical signal combiner can generate a combined phase-encoded signal from the plurality of phase-encoded signals. In some embodiments, the optical signal combiner is a multiplexer. Further details regarding these embodiments will be described in further detail below with reference to FIG. 4.

Figure 3:
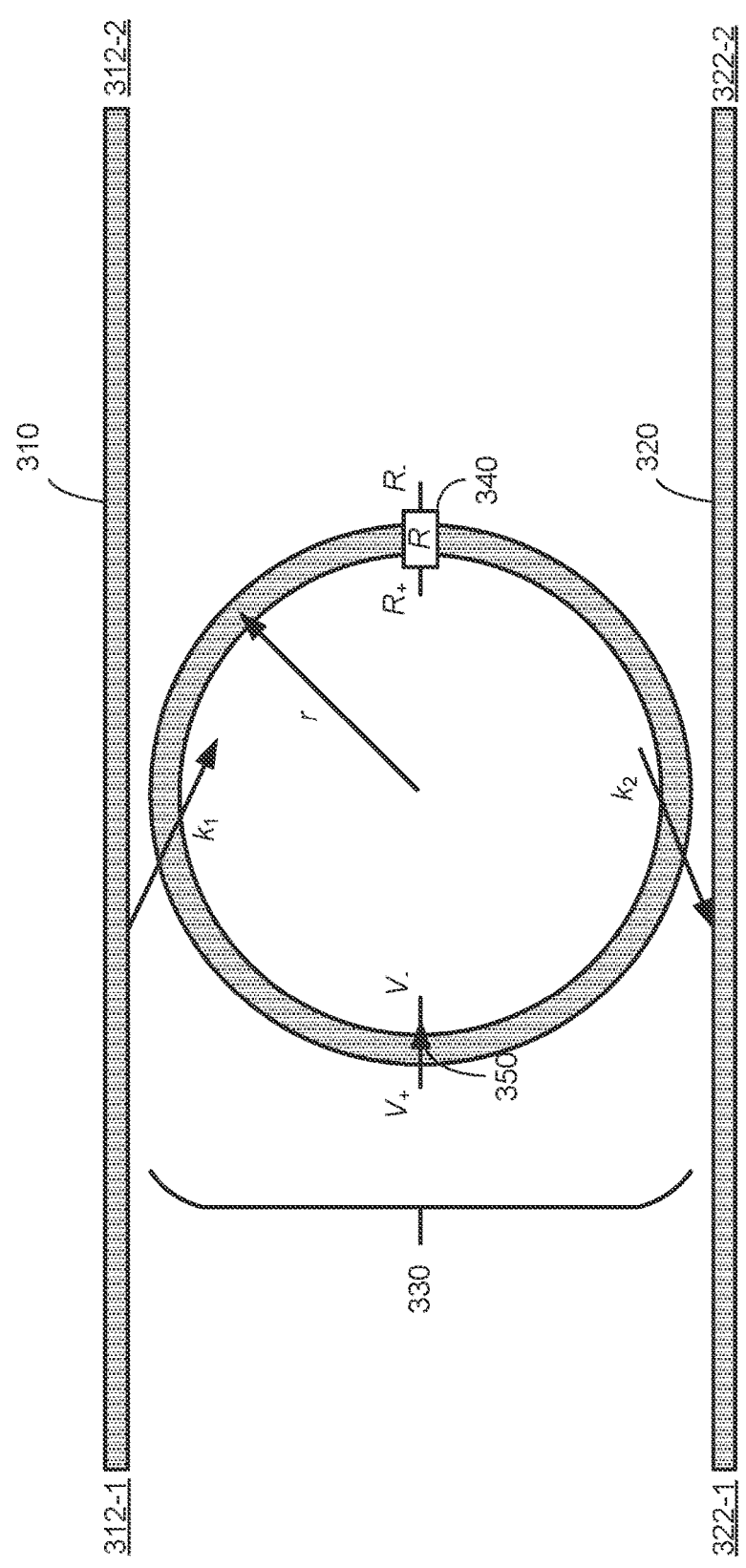
FIG. 3 illustrates an example ring resonator, in accordance with at least some embodiments.

FIG. 3 illustrates an example ring resonator 300, in accordance with at least some embodiments. Ring resonator 300 can be implemented as a phase encoder (e.g., in phase encoding component 220 and/or transmitter output generator 236) or a phase decoder (e.g., in the phase decoding component 232 and/or receiver input generator 242), as described above with reference to FIG. 2. Ring resonator 300 includes a pair of bus waveguides 310 and 320. For example, bus waveguide 310 can be a through bus waveguide and bus waveguide 320 can be a drop bus waveguide. In some embodiments, and as shown in this illustrative example, bus waveguides 310 and 320 are linear (e.g., horizontal) waveguides. However, bus waveguides 310 and 320 can have any suitable shape in accordance with embodiments described herein.

Bus waveguides 310 and 320 can have respective ports, which can be used to address and probe the behavior of Ring resonator 300. As shown in this illustrative example, bus waveguide 310 can have ports 312-1 and 312-2, and bus waveguide 320 can have ports 322-1 and 322-2. For example, port 312-1 can be referred to as an input port, port 312-2 can be referred to as a through port, port 322-1 can be referred to as a drop port and port 322-2 can be referred to as an add port. Accordingly, in this illustrative example, Ring resonator 300 can be a four-port ring resonator.

Ring resonator 300 further includes ring waveguide 330 disposed between bus waveguides 310 and 320. Ring waveguide 330 is a closed-loop structure. The arrow "r" denotes the radius of ring waveguide 330, as measured as the distance from the center of the ring to the center of ring waveguide 330. The radius of ring waveguide 330 can be on the order of micrometers or microns (μm) in some embodiments. In some embodiments, the radius of ring waveguide 330 is between about 1 μm to about 10 μm.

Ring resonator 300 is configured to receive an optical signal including one or more wavelengths (of radiation) generated by an optical signal generator (e.g., the optical signal generator 210 of FIG. 2). In some embodiments, the optical signal includes multiple wavelengths. For example, the optical signal can include a light signal generated by a laser. The optical signal can be received in port 312-1. Ring waveguide 330 can be tuned to a resonant wavelength ($\lambda_o$) or a resonant frequency ($f_o$) such that on-resonance photons (i.e., photons of the optical signal having the resonant wavelength/frequency) are coupled to ring waveguide 330 and re-routed to port 322-1, while off-resonance photons (i.e., photons of the optical signal not having the resonant wavelength/frequency) pass through toward port 312-2. Accordingly, ring waveguide 330 can function as a spectral filter.

Illustratively, assume that a first photon is an on-resonance photon received by port 312-1. As this photon travels left to right, the first photon enters ring waveguide 330 via optical coupling. If a second photon is an on-resonance photon received by port 312-1, the second photon adds coherently (in phase and polarization and frequency) with the first photon that is already in ring waveguide 330. This initiates a process referred to as field enhancement, in which on-resonance photons continue to build up within ring waveguide 330. Arrow "$k_1$" denotes a first coupling coefficient corresponding to an amount of optical power coupled to ring waveguide 330 from bus waveguide 310 (e.g., percentage).

Waveguides 310-330 can be formed from any suitable material that has properties (e.g., index of refraction) defining the resonant wavelength/frequency, and thus enabling the optical coupling of on-resonance photons within ring waveguide 330. In some embodiments, the waveguides 310-330 are formed from a semiconductor material. For example, waveguides 310-330 can be formed from silicon (Si). Alternatively, at least one of waveguides 310-330 can be formed from a different material.

The field enhancement process described above cannot occur indefinitely. At a certain electrical field or optical power level, the number of on-resonance photons within ring waveguide 330 can reach a saturation threshold and begin to radiate or couple out of ring waveguide 330. Arrow "$k_2$" denotes a second coupling coefficient corresponding to an amount of optical power coupled from ring waveguide 330 to bus waveguide 320 (e.g., percentage).

The optical power level can be correlated with a quality factor of ring resonator 300, Q. The quality factor Q is a dimensionless quantity that serves as a metric of "sharpness" of resonance or filtering achieved by ring waveguide 330. The quality factor Q can be used to determine the average number of round-trip turns or cycles that a photon can make before leaving ring waveguide 330 and entering bus waveguide 320. For example, the quality factor Q can be directly (e.g., linearly) related to average photon lifetime, which is the average time that a photo will spend in ring waveguide 330 before exiting. Accordingly, the higher the quality factor Q, the greater the average photon lifetime and number of round-trip turns.

The quality factor Q can be inversely proportional to a full width at half maximum (FWHM) value of the transmission spectra observed to exit through port 312-2. For example, $Q=\lambda_0/\text{FWHM}$. Here, the FWHM is the difference or distance between two wavelength values, observed at port 312-2, having an optical power level determined to be equal to half of a maximum optical power value. For example, the optical power level can be modeled as a transfer function (e.g., Lorentzian). Accordingly, a greater FWHM value translates into a lower Q value. The FWHM value can be defined by a first wavelength $\lambda_1$ having a value less than the value of $\lambda_0$ and a second wavelength $\lambda_2$ having a value greater than the value of $\lambda_0$.

The quality factor Q can impact the sensitivity of the encoded phase shift to the incoming optical signal. For example, the higher the quality factor Q, the "steeper" the slope and finer voltage steps may be implemented to perform the phase shaft (e.g., 1 millivolt (mV) instead of 10 mV). A higher quality factor Q can also be helpful to reduce cross-talk with respect to a many-wavelength system in which many incoming optical signals are spaced spectrally close to each other.

In some embodiments, ring resonator 300 is an over-coupled ring resonator. More specifically, ring waveguide 330 can be in an overcoupled state in an on-resonance photon couples into ring waveguide 330, spins around, and leaves via port 312-2 and is nearly unaffected in loss. In this condition, the on-resonance photon still will spend a certain amount of time within in ring waveguide 330 and will see no attenuation.

At least one electrical component can be operatively coupled (e.g., integrated into) ring waveguide 330 to modify at least one property of ring waveguide 330. For example, applying a voltage (e.g., bias) to the at least one electrical component can cause a modification to at least the index of refraction of ring waveguide 330, which can tune the resonant frequency of ring resonator 300. The at least one electrical component can include any suitable electronic component(s) in accordance with embodiments described herein. In some embodiments, the at least one electrical component can include at least one of a diode, a resistor, or a transistor (e.g., field-effect transistor (FET)). Thus, the at least one electrical component can enable a variable resonant frequency. Multiple electrical component (e.g., diodes, resistors and/or transistors) that have respective sensitivities can be used to tune the resonant frequency. Accordingly, the at least one electrical component can include multiple electrical components to achieve greater precision in resonant frequency tuning, in some embodiments.

In this illustrative embodiment, the at least one electrical component includes diode 340. In some embodiments, diode 340 is a P-N diode including a P-N junction between P-type semiconductor material and N-type semiconductor material. In some embodiments, diode 340 is a P-I-N diode, in which intrinsic semiconductor material (I) is disposed between P-type and N-type semiconductor material. For example, when diode 340 is in an off state (i.e., turned off), ring resonator 300 can have an initial resonant frequency. When processing circuitry causes an amount of positive voltage to be applied to diode 340, diode 340 can generate a corresponding number of charge carriers for injection into ring waveguide 330. These charge carriers can modify the index of refraction of ring waveguide 330 (e.g., Si waveguide) in a manner that modifies the initial resonant frequency. As another example, if diode 340 is a P-N diode, then an amount of negative voltage applied to diode 340 can expand the depletion region between the P-type semiconductor material and the N-type semiconductor material. This can cause removal of charge carriers from ring waveguide 330, which can modify the initial resonant frequency. Additionally or alternatively, as shown in this illustrative embodiment, the at least one electrical component can include resistor (e.g., resistive heater) 350. For example, when processing circuitry causes an amount of voltage to be applied to resistor 350, resistor 350 can tune the local temperature which tunes the resonant frequency. Diode 340 and resistor 350 can adjust the resonant frequency with different amounts of granularity. For example, diode 340 can be a fine-tuning component and resistor 350 can be a coarse-tuning component.

The resonant frequency can be tuned using resonant frequency tuning data (e.g., digital data). For example, the resonant frequency tuning data can include built-in self-test (BIST) data that can be used as feedback for adjusting the at least one electrical component. More specifically, processing circuitry can adjust the at least one electrical component to modify the resonant frequency by modifying, e.g., an index of refraction of a waveguide material of the ring waveguide. Adjusting the at least one electrical component to modify the at least one property of the at least one optical delay component can include determining a resonant frequency from the resonant frequency tuning data, and causing an amount of voltage, current, power, etc. to be applied to the at least one electrical component in accordance with the resonant frequency. In some embodiments, the amount of voltage, current, power, etc. causes the at least one electrical component to, in accordance with the amount of optical delay, perform at least one of: generate a number of charge carriers, or change a local temperature of the at least one optical delay component. The relationship between the resonant frequency and the amount of voltage, current, power, etc. to be applied to the at least one electrical component can be determined a priori at the foundry fabrication level during device calibration. For example, the processing circuitry can determine, from the resonant frequency tuning data, the amount of voltage to be applied to the at least one electrical component in a number of ways. In some embodiments, the resonant frequency tuning data includes calibration data (e.g., stored in a look-up stable in local memory). The processing circuitry can include a feedback circuit that can analyze a current diagram (e.g., eye diagram) or jitter value (e.g., derived from a BIST block), calculate a desired amount of time delay, determine an amount of voltage to achieve the desired amount of time delay, and set the amount of voltage as the amount of voltage to be applied to the at least one electrical component. In alternative embodiments, the processing circuitry can apply different amounts of voltage within a valid range until the jitter value is minimized.

Figure 4:
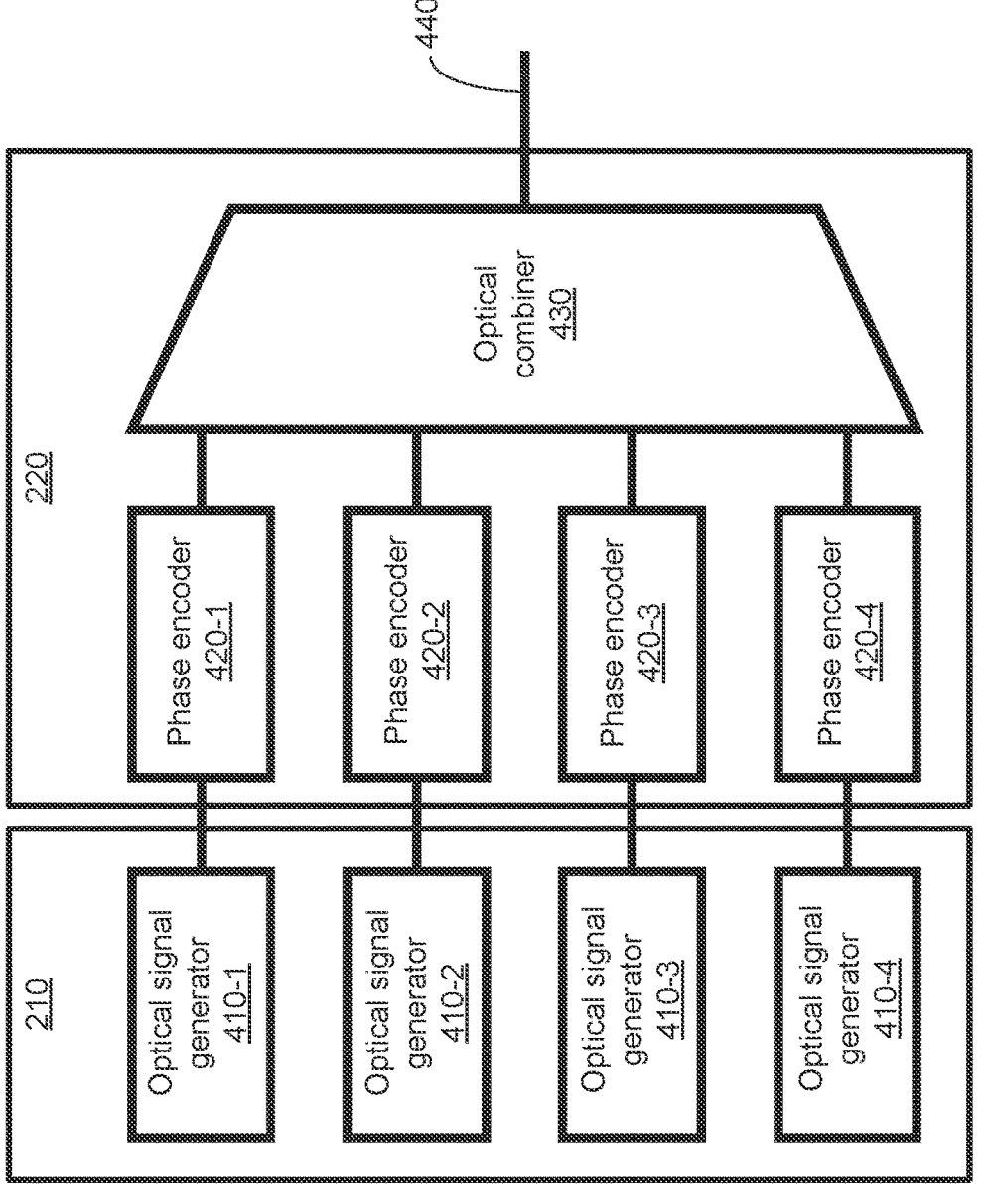
FIG. 4 illustrates an example system for implementing phase-dithering techniques for encoding auxiliary information within optical signals, in accordance with at least some embodiments.

FIG. 4 illustrates an example system 400 for implementing phase-dithering techniques for encoding auxiliary information within optical signals, in accordance with at least some embodiments. As shown, the system 400 includes a set of optical signal generators including optical signal generators 410-1 through 410-4. Each optical signal generator 410-1 through 410-4 is configured to generate an optical signal. In some embodiments, each optical signal generator 410-1 through 410-4 includes a laser. In some embodiments, each optical signal generator 410-1 through 410-4 is a multi-wavelength optical signal generator (e.g., multi-wavelength laser). Although four optical signal generators are shown, the system 400 can include any suitable number of optical signal generators.

The system 400 further includes a set of phase encoders including phase encoder devices 420-1 through 420-4. More specifically, each phase encoder 420-1 through 420-4 is operatively coupled to a respective one of the optical signal generators 410-1 through 410-4. Although four phase encoders are shown, the system 400 can include any suitable number of phase encoders (e.g., one or more phase encoders). Each phase encoder 420-1 through 420-4 can encode auxiliary information into the respective optical signal received from the respective one of optical signal generators 410-1 through 410-4 to generate a respective phase-encoded signal of a set of phase-encoded signals. In some embodiments, the auxiliary information encoded in each optical signal includes an identifier for the optical signal. For example, the identifier for an optical signal can include at least one of: an identifier wavelength of the optical signal, an identifier of the frequency of the optical signal, or an identifier indicating which of the optical signal generators 410-1 through 410-4 generated the optical signal. The one or more phase-encoded signals can be used to generate a transmitter input.

In some embodiments, each phase encoder 420-1 through 420-4 is implemented by a respective ring resonator, as described above. For example, each phase-encoder 420-1 through 420-4 can be implemented by a respective over-coupled ring resonator with a ring waveguide having an overcoupled state. Further details regarding ring resonators are described above with reference to FIGS. 2-3.

The system 400 further includes an optical signal combiner 430 operatively coupled to the set of phase encoders. In some embodiments, the optical signal combiner 430 includes an optical multiplexer. The optical signal combiner 430 can generate a transmitter input to be sent to a transmitter an optical link 440 in which the auxiliary information remains unchanged. For example, the transmitter input can be sent to a phase decoder (e.g., phase decoding component 232) to decode the auxiliary information from the phase-encoded signal. Further details regarding system 400 are described above with reference to FIGS. 2-3.

Figures 5A, 5B, 5C:
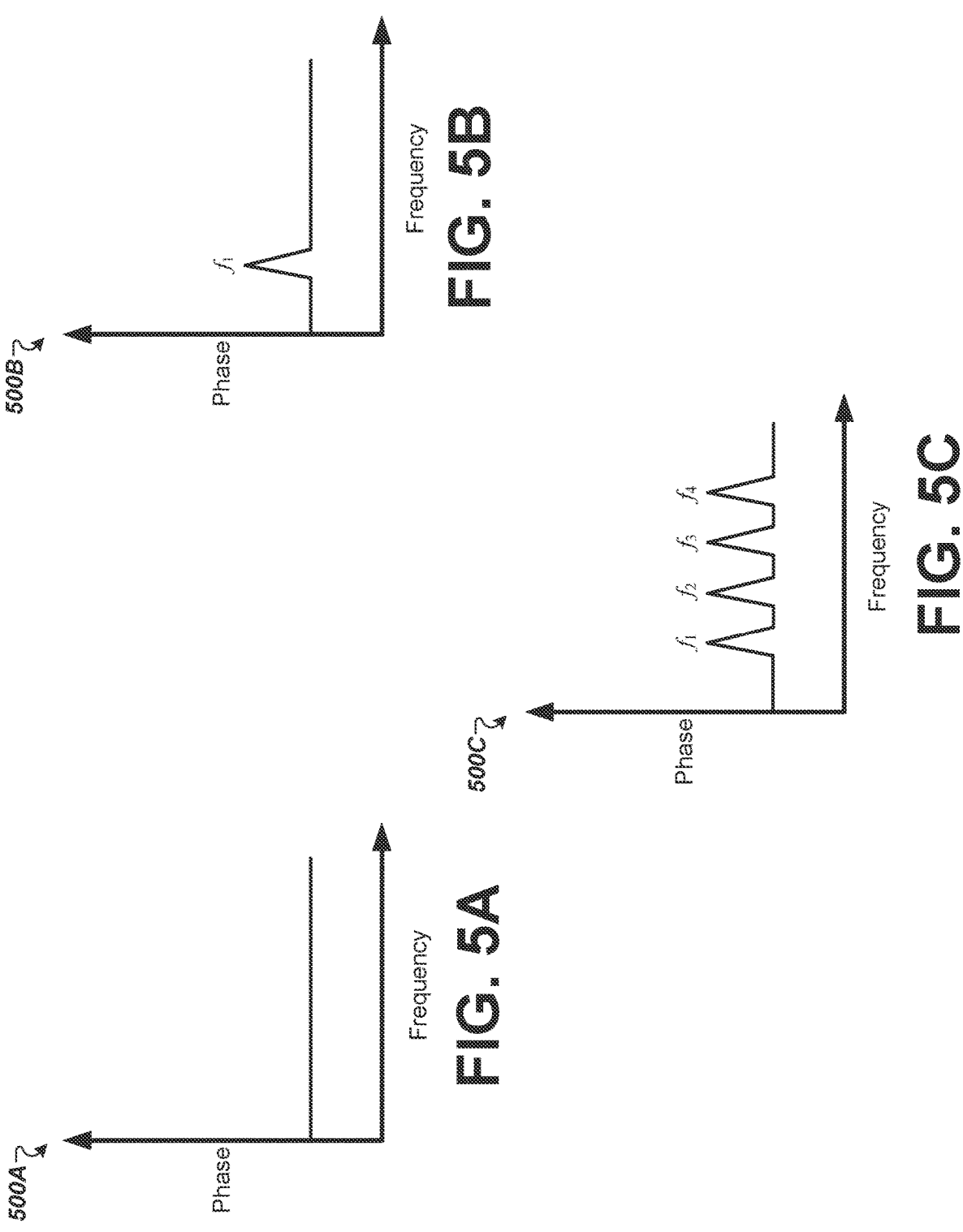
FIGS. 5A-5C are example graphs illustrating phase shift at resonant frequencies of a phase encoder, in accordance with at least some embodiments.

FIGS. 5A-5C are example graphs illustrating phase shift at resonant frequencies of a phase encoder, in accordance with at least some embodiments. For example, FIG. 5A illustrates a graph 500A of optical signal generated by an optical signal generator (e.g., optical signal generator 410-1). FIG. 5B illustrates a graph 500B showing a phase-encoded signal generated by a phase encoder that received the optical signal (e.g., phase encoder 420-1). More specifically, as shown in graph 500B, the phase encoder can be implemented by a ring resonator having resonant frequency $f_1$ in which a corresponding phase shift is observed. FIG. 5C illustrates a graph 500C showing a combined phase-encoded signal after being received by an optical signal combiner (e.g., optical multiplexer). For example, the combined phase-encoded signal can be generated from the phase-encoded signal generated using the ring resonator having resonant frequency $f_1$, along with phase-encoded signals generated using other ring resonators having respective resonant frequencies $f_2$ through $f_4$ (e.g., phase encoders 420-2 through 420-4).

Figure 6:
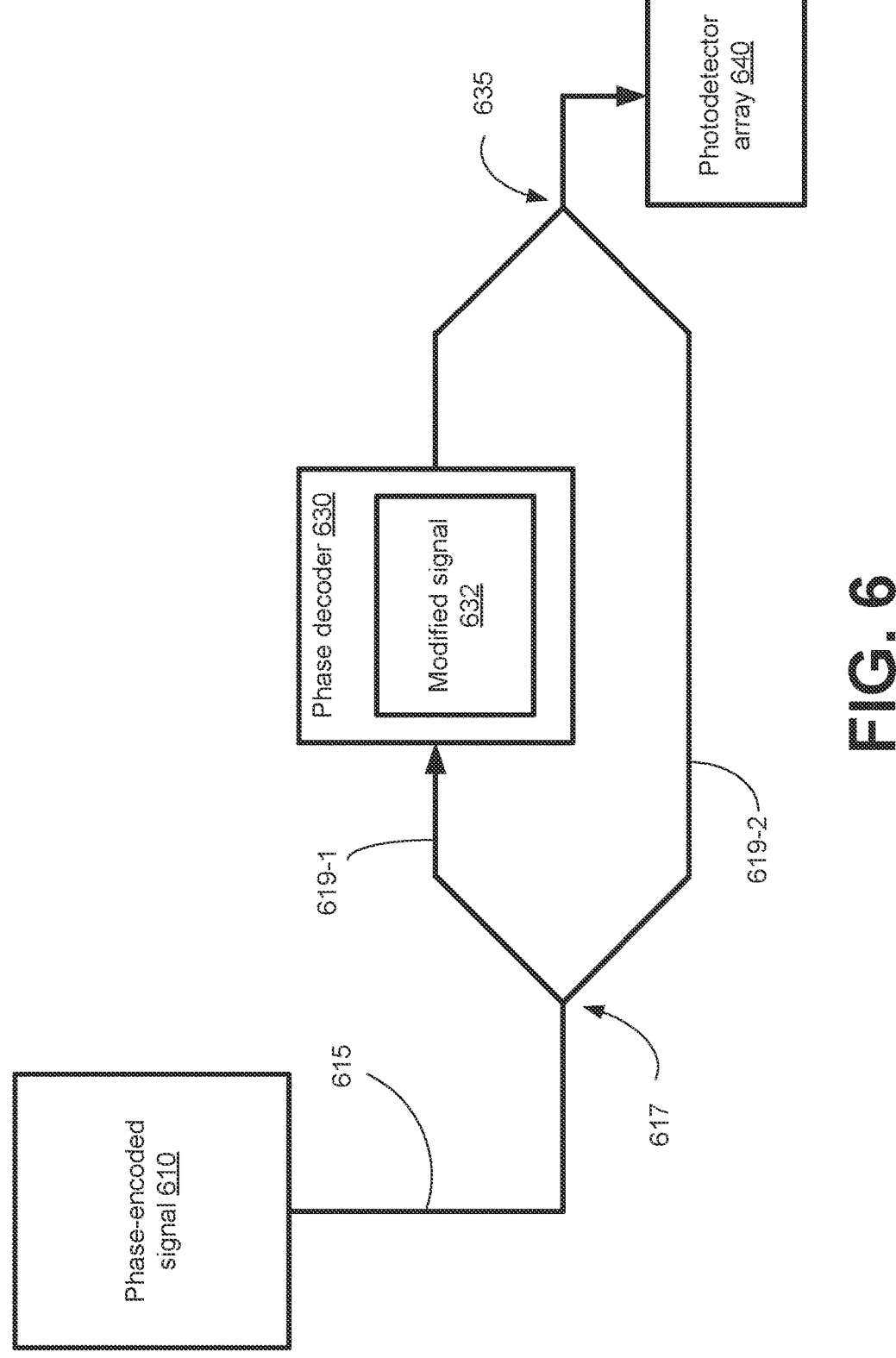
FIG. 6 illustrates an example system for implementing a phase decoder, in accordance with at least some embodiments.

FIG. 6 illustrates an example system 600 for implementing a phase decoder, in accordance with at least some embodiments. As shown, phase-encoded signal 610 is provided that includes auxiliary information encoded within a phase of an optical signal. For example, phase-encoded signal 610 can be generated by a single phase encoder (e.g., phase encoding component 220 of FIG. 2). As another example, phase-encoded signal 610 can be a combined phase-encoded signal generated by combining a plurality of phase-encoded signals each generated by a respective phase encoder (e.g., phase encoders 420-1 through 420-4 of FIG. 4) using an optical signal combiner (e.g., optical signal combiner 430 of FIG. 4).

Phase-encoded signal 610 can be sent, via data path 615, to a y-branch indicated by point 617. In some embodiments, phase-encoded signal 610 includes a portion of the optical signal. For example, a second portion of the optical signal can be sent to a modulator array along a main data path. Phase-encoded signal 610 at point 617 can be split into symmetric data paths 619-1 and 619-2. Phase-encoded signal 610 can, via data path 619-1, be received by phase decoder 630. In some embodiments, phase decoder 630 modifies phase-encoded signal 610 to obtain modified signal 632. For example, phase decoder 630 can modify the phase of phase-encoded signal 610. Modified signal 632 can interfere with phase-encoded signal 610 at a y-branch indicated by point 635 to generate an interference signal. The interference signal can then be received by photodetector array 640. In some embodiments, phase decoder 630 does not modify phase-encoded signal 610. In these embodiments, there is no modified signal 632 to interfere with phase-encoded signal 610. Thus, in these embodiments, the auxiliary information may not be recoverable.

The output of photodetector array 640 is the auxiliary information from phase-encoded signal 610. The auxiliary information can indicate whether any actions should be performed to improve the functionality of a communication system. For example, the auxiliary information can be used to determine whether at least one of an optical signal generator, a transmitter, or a receiver should be tuned to improve performance.

Figure 7:
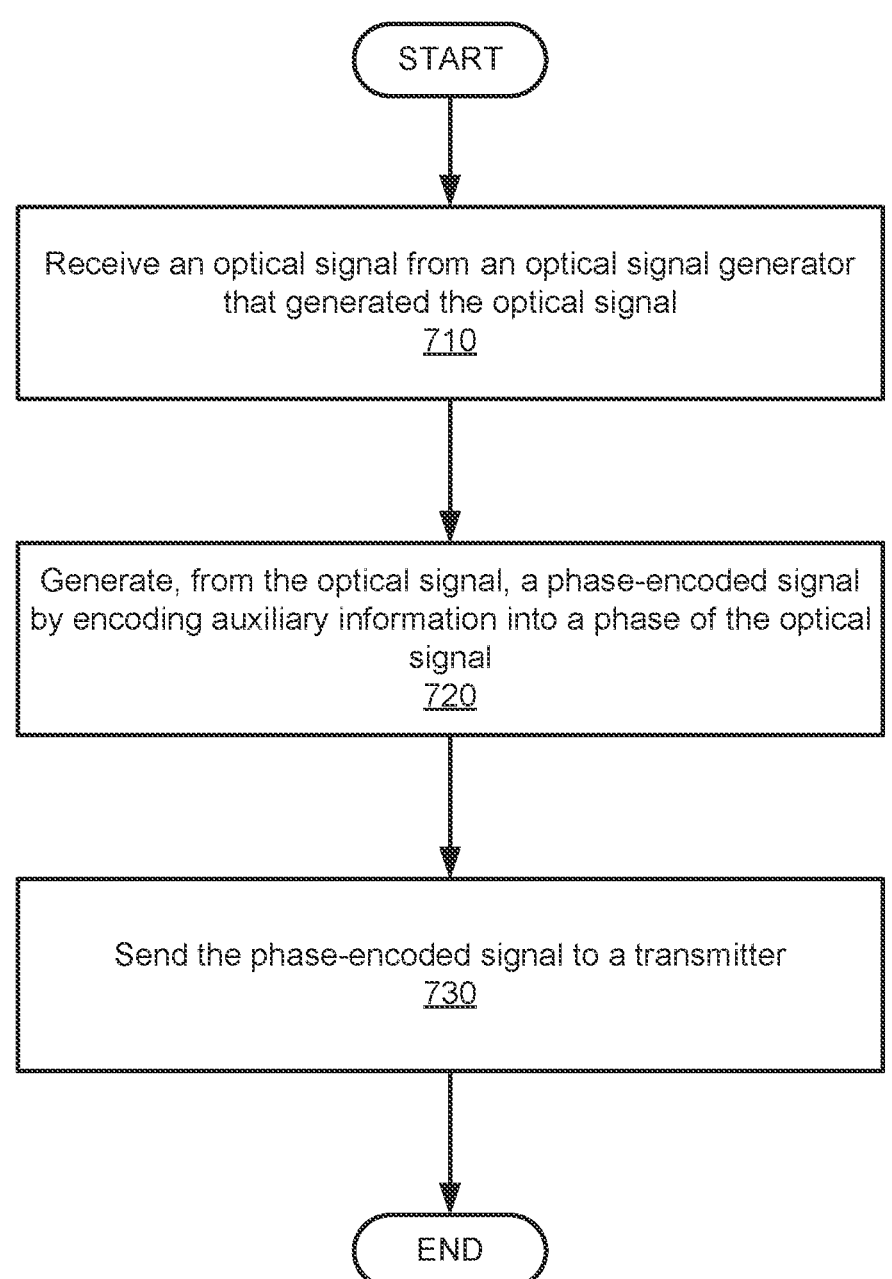
FIGS. 7-8 are a flow diagram of example methods to implement phase-dithering techniques for encoding auxiliary information within optical signals, in accordance with at least some embodiments.

FIG. 7 illustrates a flow diagram of a method 700 to implement phase-dithering techniques for encoding auxiliary information within optical signals, according to at least one example embodiment. The method 700 can be performed by processing logic comprising hardware, software, firmware, or any combination thereof. In at least one embodiment, the method 700 is performed by one or more phase encoders, such as phase encoder(s) 220 of FIG. 2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 710, an optical signal is received. For example, the optical signal can be received from an optical signal generator. In some embodiments, the optical signal generator is a multi-wavelength optical signal generator. In some embodiments, the optical signal generator is a laser.

At operation 720, a phase-encoded signal is generated from the optical signal. More specifically, generating the phase-encoded signal can include encoding phase information into a phase of the optical signal. The phase-encoded signal can be generated by a phase encoder. In some embodiments, the phase encoder includes a ring resonator having a resonant frequency. For example, the ring resonator can be an overcoupled ring resonator.

At operation 730, a transmitter input generated from the phase-encoded signal is sent to a transmitter. For example, sending the transmitter input can include generating the transmitter input. Generating the transmitter input can include combining a plurality of phase-encoded signals including the phase-encoded signal into a combined phase-encoded signal corresponding to the transmitter input. Each phase-encoded signal of the plurality of phase-encoded signals can be generated by a respective phase encoder, and each phase encoder can receive an optical signal generated by a respective optical signal generator. The plurality of phase-encoded signals can be combined using an optical signal combiner. In some embodiments, the optical signal combined is an optical multiplexer. Further details regarding operations 710-730 are described above with reference to FIGS. 2-6.

Figure 8:
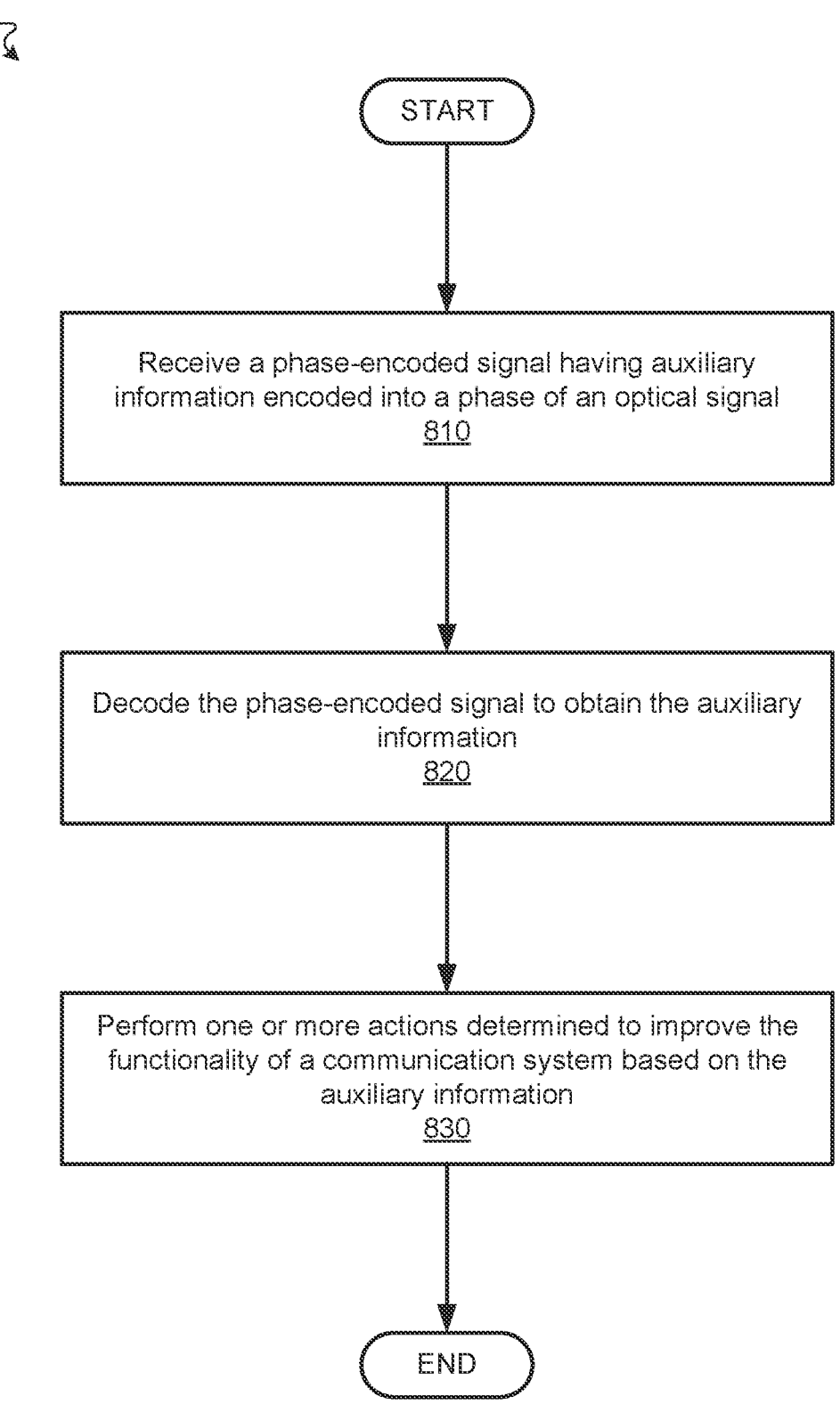

FIG. 8 illustrates a flow diagram of a method 800 to implement phase-dithering techniques for encoding auxiliary information within optical signals, according to at least one example embodiment. The method 800 can be performed by processing logic comprising hardware, software, firmware, or any combination thereof. In at least one embodiment, the method 800 is performed by a phase decoder, such as phase decoding component 232 of FIG. 2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 810, processing logic can receive a phase-encoded signal having auxiliary information encoded into a phase of an optical signal. The phase-encoded signal can be generated from one or more phase-encoded signals each generated by a respective phase encoder. In some embodiments, each phase encoder includes a ring resonator. For example, the ring resonator can be an overcoupled ring resonator. For example, the phase-encoded signal can be a combined phase-encoded signal generated by an optical signal combiner, at the phase-encoded signal can be received from the optical signal combiner.

At operation 820, processing logic can decode the phase-encoded signal to obtain the auxiliary information. The phase-encoded signal can be decoded using a phase decoder. In some embodiments, auxiliary information is decoded by employing a data mask that decodes the auxiliary information. The data mask can be designed in accordance with a communication protocol that defining the auxiliary information to be decoded from the phase-encoded signal. For example, auxiliary information can be encoded in accordance with a predefined bit pattern, and the data mask can be designed to recover the auxiliary information based on the predefined bit pattern. In some embodiments, the phase decoder includes a ring resonator. For example, the ring resonator can be an overcoupled ring resonator. In some embodiments, the phase decoder includes an interferometer. For example, the phase decoder can include a y-junction.

In some embodiments, at operation 830, processing logic can perform one or more actions determined to improve the functionality of a communication system based on the auxiliary information. For example, the auxiliary information encoded into the phase domain can be used to determine whether at least one of an optical signal generator, a transmitter, or a receiver should be tuned to improve performance.

For example, the auxiliary information can include "out of band" communication info such as local transmitter temperature with respect to the receiver. Additionally or alternatively, the auxiliary information can include optical signal generator health information, which can be used by the receiver to determine whether to reduce its incoming optical attenuation to avoid burning the receiver. Additionally or alternatively, the auxiliary information can include error correction codes (e.g., parity bits) that can be used to fix erroneous bits. For example, error correction codes can be Forward Error Correction (FEC) codes. One example of an FEC code is Reed-Solomon code. By sending the error correction codes out of band, data can be corrected without affecting the payload. Further details regarding operations 810-830 are described above with reference to FIGS. 2-7.

Figure 9:
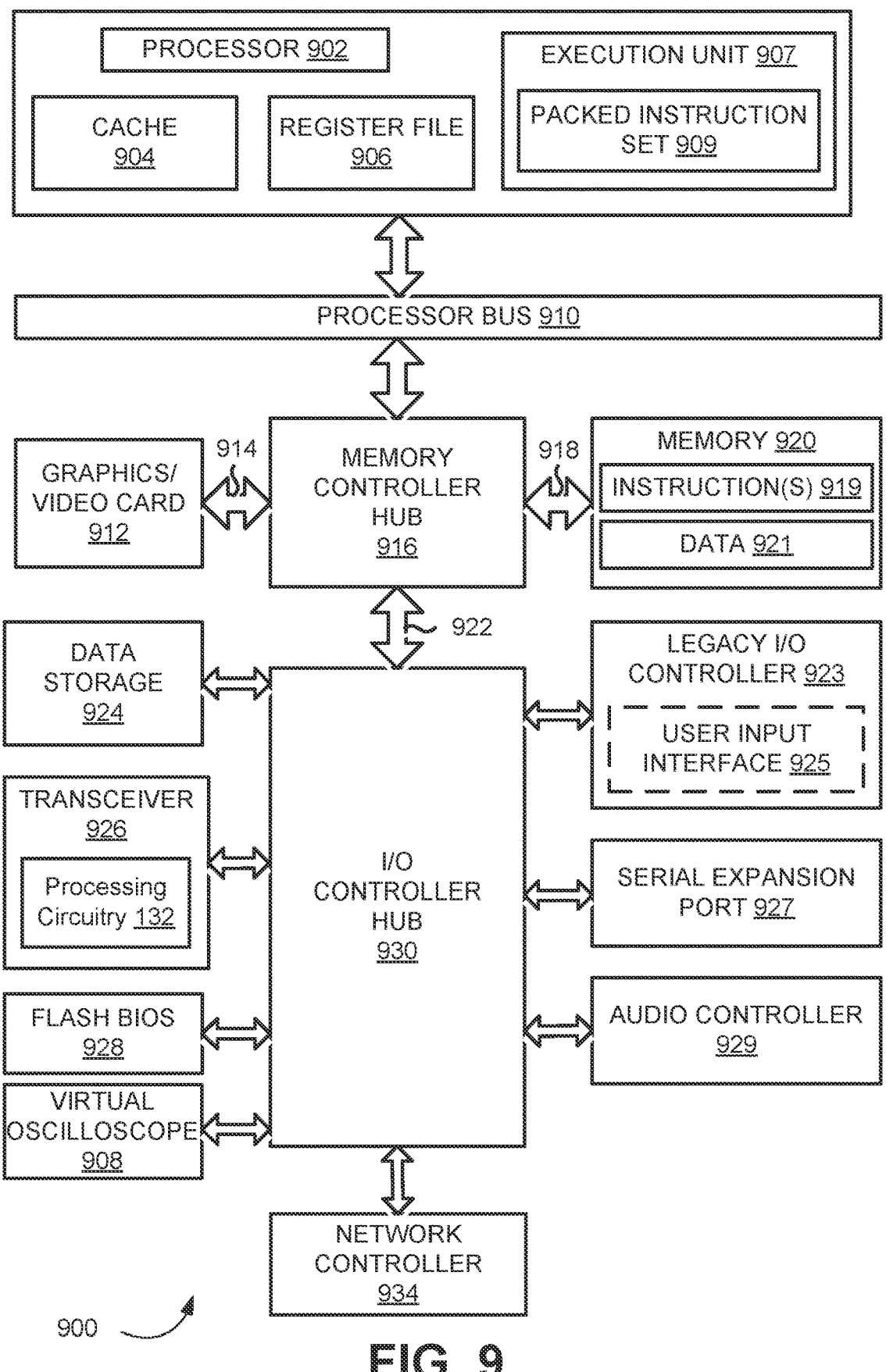
FIG. 9 illustrates an example computer system including a transceiver including a chip-to-chip interconnect, in accordance with at least some embodiments.

FIG. 9 illustrates a computer system 900 including a transceiver including a chip-to-chip interconnect, in accordance with at least one embodiment. In at least one embodiment, computer system 900 may be a system with interconnected devices and components, an SOC, or some combination. In at least one embodiment, computer system 900 is formed with a processor 902 that may include execution units to execute an instruction. In at least one embodiment, computer system 900 may include, without limitation, a component, such as processor 902 to employ execution units including logic to perform algorithms for processing data. In at least one embodiment, computer system 900 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 900 may execute a version of WINDOWS' operating system available from Microsoft Corporation of Redmond, Wash., although other operating systems (UNIX and Linux for example), embedded software, and/or graphical user interfaces, may also be used.

In at least one embodiment, computer system 900 may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor (DSP), an SoC, network computers ("NetPCs"), set-top boxes, network hubs, wide area network ("WAN") switches, or any other system that may perform one or more instructions. In an embodiment, computer system 900 may be used in devices such as graphics processing units (GPUs), network adapters, central processing units and network devices such as switch (e.g., a high-speed direct GPU-to-GPU interconnect such as the NVIDIA GH100 NVLINK or the NVIDIA Quantum 2 64 Ports InfiniBand NDR Switch).

In at least one embodiment, computer system 900 may include, without limitation, processor 902 that may include, without limitation, one or more execution units 907 that may be configured to execute a Compute Unified Device Architecture ("CUDA") (CUDA® is developed by NVIDIA Corporation of Santa Clara, CA) program. In at least one embodiment, a CUDA program is at least a portion of a software application written in a CUDA programming language. In at least one embodiment, computer system 900 is a single processor desktop or server system. In at least one embodiment, computer system 900 may be a multiprocessor system. In at least one embodiment, processor 902 may include, without limitation, a CISC microprocessor, a RISC microprocessor, a VLIW microprocessor, a processor implementing a combination of instruction sets, or any other processor device, such as a digital signal processor, for example. In at least one embodiment, processor 902 may be coupled to a processor bus 910 that may transmit data signals between processor 902 and other components in computer system 900.

In at least one embodiment, processor 902 may include, without limitation, a Level 1 ("L1") internal cache memory ("cache") 904. In at least one embodiment, processor 902 may have a single internal cache or multiple levels of internal cache. In at least one embodiment, cache memory may reside external to processor 902. In at least one embodiment, processor 902 may also include a combination of both internal and external caches. In at least one embodiment, a register file 906 may store different types of data in various registers including, without limitation, integer registers, floating point registers, status registers, and instruction pointer register.

In at least one embodiment, execution unit 907, including, without limitation, logic to perform integer and floating point operations, also resides in processor 902. Processor 902 may also include a microcode ("ucode") read only memory ("ROM") that stores microcode for certain macro instructions. In at least one embodiment, execution unit 902 may include logic to handle a packed instruction set 909. In at least one embodiment, by including packed instruction set 909 in an instruction set of a general-purpose processor 902, along with associated circuitry to execute instructions, operations used by many multimedia applications may be performed using packed data in a general-purpose processor 902. In at least one embodiment, many multimedia applications may be accelerated and executed more efficiently by using full width of a processor's data bus for performing operations on packed data, which may eliminate a need to transfer smaller units of data across a processor's data bus to perform one or more operations one data element at a time.

In at least one embodiment, an execution unit may also be used in microcontrollers, embedded processors, graphics devices, DSPs, and other types of logic circuits. In at least one embodiment, computer system 900 may include, without limitation, a memory 920. In at least one embodiment, memory 920 may be implemented as a DRAM device, an SRAM device, flash memory device, or other memory device. Memory 920 may store instruction(s) 919 and/or data 921 represented by data signals that may be executed by processor 902.

In at least one embodiment, a system logic chip may be coupled to processor bus 910 and memory 920. In at least one embodiment, the system logic chip may include, without limitation, a memory controller hub ("MCH") 916, and processor 902 may communicate with MCH 916 via processor bus 910. In at least one embodiment, MCH 916 may provide a high bandwidth memory path 918 to memory 920 for instruction and data storage and for storage of graphics commands, data and textures. In at least one embodiment, MCH 916 may direct data signals between processor 902, memory 920, and other components in computer system 700 and to bridge data signals between processor bus 910, memory 920, and a system I/O 922. In at least one embodiment, system logic chip may provide a graphics port for coupling to a graphics controller. In at least one embodiment, MCH 916 may be coupled to memory 920 through high bandwidth memory path 918 and graphics/video card 912 may be coupled to MCH 916 through an Accelerated Graphics Port ("AGP") interconnect 914.

In at least one embodiment, computer system 900 may use system I/O 922 that is a proprietary hub interface bus to couple MCH 916 to I/O controller hub ("ICH") 930. In at least one embodiment, ICH 930 may provide direct connections to some I/O devices via a local I/O bus. In at least one embodiment, local I/O bus may include, without limitation, a high-speed I/O bus for connecting peripherals to memory 920, a chipset, and processor 902. Examples may include, without limitation, an audio controller 929, a firmware hub ("flash BIOS") 928, a transceiver 926, a data storage 924, a legacy I/O controller 923 containing a user input interface 925 and a keyboard interface, a serial expansion port 927, such as a USB, and a network controller 934. Data storage 924 may comprise a hard disk drive, a floppy disk drive, a CD-ROM device, a flash memory device, or other mass storage device. In an embodiment, the transceiver 926 includes a constrained FFE 908.

In at least one embodiment, FIG. 9 illustrates a system, which includes interconnected hardware devices or "chips" in the transceiver 926—e.g., the transceiver 926 includes a chip-to-chip interconnect including the first device 110 and second device 112 as described with reference to FIG. 1). In at least one embodiment, FIG. 9 may illustrate an exemplary SoC. In at least one embodiment, devices illustrated in FIG. 9 may be interconnected with proprietary interconnects, standardized interconnects (e.g., PCIe), or some combination thereof. In at least one embodiment, one or more components of system 900 are interconnected using compute express link ("CXL") interconnects. In an embodiment, the transceiver 926 can include processing circuitry 132 as described with reference to FIG. 1. In such embodiments, the processing circuitry 132 can facilitate a method to implement phase-dithering techniques for encoding auxiliary information within an optical signal. For example, the processing circuitry 132 can implement phase-dithering techniques for encoding auxiliary information within an optical signal, as described with reference to FIGS. 2-5.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit the disclosure to a specific form or forms disclosed, but on the contrary, the intention is to cover all modifications, alternative constructions, and equivalents falling within the spirit and scope of the disclosure, as defined in appended claims.

Use of terms "a" and "an" and "the" and similar referents in the context of describing disclosed embodiments (especially in the context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitations of ranges of values herein are merely intended to serve as a shorthand method of referring individually to each separate value falling within the range, unless otherwise indicated herein, and each separate value is incorporated into the specification as if it were individually recited herein. In at least one embodiment, the use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but subset and corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in an illustrative example of a set having three members, conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). In at least one embodiment, the number of items in a plurality is at least two, but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in the form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause a computer system to perform operations described herein. In at least one embodiment, a set of non-transitory computer-readable storage media comprises multiple non-transitory computer-readable storage media and one or more of individual non-transitory storage media of multiple non-transitory computer-readable storage media lack all of the code while multiple non-transitory computer-readable storage media collectively store all of the code. In at least one embodiment, executable instructions are executed such that different instructions are executed by different processors.

Accordingly, in at least one embodiment, computer systems are configured to implement one or more services that singly or collectively perform operations of processes described herein and such computer systems are configured with applicable hardware and/or software that enable the performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

All references, including publications, patent applications, and patents, cited herein are hereby incorporated by reference to the same extent as if each reference were individually and specifically indicated to be incorporated by reference and were set forth in its entirety herein.

In description and claims, terms "coupled" and "connected," along with their derivatives, may be used. It should be understood that these terms may not be intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, the term "processor" may refer to any device or portion of a device that processes electronic data from registers and/or memory and transform that electronic data into other electronic data that may be stored in registers and/or memory. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as the system may embody one or more methods and methods may be considered a system.

In the present document, references may be made to obtaining, acquiring, receiving, or inputting analog or digital data into a subsystem, computer system, or computer-implemented machine. In at least one embodiment, the process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or inter-process communication mechanism.

Although descriptions herein set forth example embodiments of described techniques, other architectures may be used to implement described functionality, and are intended to be within the scope of this disclosure. Furthermore, although specific distributions of responsibilities may be defined above for purposes of description, various functions and responsibilities might be distributed and divided in different ways, depending on circumstances.

Furthermore, although the subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A system comprising:
one or more phase encoders, each phase encoder of the one or more phase encoders being configured to:
receive an optical signal from an optical signal generator that generated the optical signal; and
generate, using a ring resonator having a resonant frequency, a phase-encoded signal by encoding auxiliary information into a phase of the optical signal, wherein the auxiliary information comprises at least one of: an identifier of a wavelength of the optical signal, an identifier of a frequency of the optical signal, or an identifier of the optical signal generator.

2. The system of claim 1, wherein the ring resonator is an overcoupled ring resonator.

3. The system of claim 1, wherein the ring resonator comprises at least one electrical component configured to tune the resonant frequency by modifying an index of refraction of a waveguide material of the ring resonator.

4. The system of claim 1, wherein the optical signal generator is a multi-wavelength optical signal generator, and wherein the optical signal is a multi-wavelength optical signal.

5. The system of claim 1, wherein the one or more phase encoders comprise a plurality of phase encoders, each phase encoder of the plurality of phase encoders being configured to generate a respective phase-encoded signal of a plurality of phase-encoded signals, and wherein the system further comprises an optical signal combiner configured to generate a combined phase-encoded signal from the plurality of phase-encoded signals.

6. The system of claim 1, wherein the auxiliary information further comprises at least one of: temperature information, or power information.

7. A method, comprising:
receiving, by a phase encoder comprising a ring resonator having a resonant frequency, an optical signal from an optical signal generator that generated the optical signal; and
generating, by the phase encoder, a phase-encoded signal by encoding auxiliary information into a phase of the optical signal, wherein the auxiliary information comprises at least one of: an identifier of a wavelength of the optical signal, an identifier of a frequency of the optical signal, or an identifier of the optical signal generator.

8. The method of claim 7, wherein the ring resonator is an overcoupled ring resonator.

9. The method of claim 7, further comprising tuning the resonant frequency by modifying an index of refraction of a waveguide material of the ring resonator.

10. The method of claim 7, wherein the optical signal is a multi-wavelength optical signal.

11. The method of claim 7, further comprising generating a combined phase-encoded signal from a plurality of phase-encoded signals comprising the phase-encoded signal.

12. The method of claim 7, wherein the auxiliary information further comprises at least one of: temperature information, or power information.

13. A system comprising:
a phase decoder comprising a y-junction interferometer and configured to:
receive a phase-encoded signal having auxiliary information encoded into a phase of an optical signal, wherein the auxiliary information comprises at least one of: an identifier of a wavelength of the optical signal, an identifier of a frequency of the optical signal, or an identifier of the optical signal generator; and
decode the phase-encoded signal to obtain the auxiliary information.

14. The system of claim 13, wherein the auxiliary information further comprises at least one of: temperature information, or power information.

* * * * *